United States Patent [19]

Inoue

[11] Patent Number: 4,673,787

[45] Date of Patent: Jun. 16, 1987

[54] ELECTROEROSION METHOD OF WIRE-CUTTING A DESIRED CONTOUR IN A WORKPIECE

[75] Inventor: Kiyoshi Inoue, Tokyo, Japan

[73] Assignee: Inoue-Japax Research Incorporated, Kanagawaken, Japan

[21] Appl. No.: 231,880

[22] Filed: Feb. 5, 1981

[30] Foreign Application Priority Data

Feb. 5, 1980 [JP] Japan ................................. 55-13186

[51] Int. Cl.$^4$ .............................................. B23P 1/08
[52] U.S. Cl. ................. 219/69 W; 219/69 M
[58] Field of Search ................. 219/68, 69 R, 69 M, 219/69 V, 69 W, 69 P; 204/129.2

[56] References Cited

U.S. PATENT DOCUMENTS

| 3,975,608 | 8/1976 | Ullmann et al. | 219/69 M |
| 4,104,501 | 8/1978 | Wyss | 219/69 M |
| 4,229,636 | 10/1980 | Izari | 219/69 M |
| 4,321,450 | 3/1982 | Inoue | 219/69 M |

FOREIGN PATENT DOCUMENTS 0769432 11/1971 Belgium ........................ 219/69 W Primary Examiner—M. H. Paschall
Attorney, Agent, or Firm—Karl F. Ross; Herbert Dubno

[57] ABSTRACT

An improved method of cutting a workpiece to form a desired contour therein with a continuous wire electrode axially advanced to linearly traverse the workpiece across a cutting zone and also displaced relative to the workpiece transversely to the axis of the wire electrode. The method comprises the steps of (a) electroerosively rough-cutting the workpiece while effecting the transverse relative displacement along a first predetermined path corresponding to the desired contour and defined to generate a rough-cut contour with an overcut $\alpha$ in the workpiece, and (b) electroerosively finish-cutting the workpiece while effecting the transverse relative displacement along a second predetermined path shifted by a distance n$\alpha$ uniformly from the first predetermined path where n is a value proportional to the thickness of the workpiece traversed by the wire electrode, thereby generating a finish-cut contour coinciding with the desired contour in the workpiece.

8 Claims, 3 Drawing Figures

ELECTROEROSION METHOD OF WIRE-CUTTING A DESIRED CONTOUR IN A WORKPIECE

FIELD OF THE INVENTION

The present invention relates to an electroerosion wire-cutting method and, more particularly, to a method of electroerosively cutting a workpiece to form a desired contour therein with a continuous wire electrode which is adapted to be axially advanced to linearly traverse the workpiece across a cutting zone while being displaced relative to the workpiece transversely to the axis thereof.

BACKGROUND OF THE INVENTION

In electroerosion wire-cutting, a thin continuous wire or filamentary electrode, typically of a thickness of 0.05 to 0.5 mm, is continuously advanced from a supply side to a takeup side through a cutting zone in which a workpiece is positioned and to which a cutting liquid, typically distilled water or a liquid medium of dielectric and/or electrolytic nature, is supplied. The wire electrode is continuously advanced conveniently between a pair of guide members to define a linear or straight and continuously traveling wire stretch therebetween for positioning it precisely in a predetermined machining relationship with the workpiece traversed axially thereby. An electrical machining current, advantageously in the form of a succession of time-spaced and precisely adjusted electrical pulses, is applied across a machining gap formed between the workpiece and the traveling-wire stretch to effect electrical discharges and/or electrolytic action and electroerosively remove material from the workpiece. As material removal proceeds, the workpiece is displaced relative to the linear traveling-wire stretch transversely to the axis thereof, typically under numerical control, along a predetermined path to generate a desired pattern of cut or contour in the workpiece. The continuous advance or travel of the wire electrode is effected typically by traction drive rollers disposed at a location between the guide member on the downstream side and the wire takeup means. A desired tension is established in the traveling wire bridged between the guide members typically by providing brake means at a location between the guide member on the upstream side and the wire supply means.

The path along which the workpiece is displaced relative to the linear traveling-wire stretch transversely to the axis thereof is defined empirically so that the resulting machined contour may precisely coincide both dimensionally and in shape with the desired pattern of cut. The tolerance or difference in size between the machined contour and the envelope line of the passage of the machining wire electrode (adjacent to the machined contour) is commonly called "overcut" and corresponds to the size of the machining gap formed between the wire electrode and the workpiece. There is therefore a deviation of size between the path of the axis of the machining wire electrode and the resulting or desired contour in the workpiece which is equal to the radius of the wire electrode plus the machining gap or "overcut".

An attempt in the art to yield a machined contour with high precision, surface finish and efficiency with respect to a desired contour makes common use of a double or multiple step wire-cutting process. In this process, the first step is used to rough-cut a workpiece by displacing the wire electrode relative to the workpiece along a path corresponding to the desired contour but sized to yield a rough-cut contour. The second step is used to remove the difference between the rough-cut contour and the desired contour by displacing the wire electrode relative to the workpiece along a path shifted in the plane of displacement from the first-step path by a finish-cut distance. In the prior art, this latter distance together with the rough size path in the first step has been determined solely empirically. It has been the common practice in the art to choose the finish-step cut size roughly equal to the overcut in the first, rough-cutting step.

I have now found that in such a two- or multi-step wire-cutting operation a certain problem arises due to peculiar dynamic characteristics of the wire electrode in electroerosively cutting along the previously rough-cut contour in the finish-cutting step. In the ordinary electroerosive operation or rough-cutting step in which the wire electrode is advanced transversely in the workpiece, the machining action takes place preferentially along the semi-circular surface of the wire electrode located in the direction of advance. The machining action is accompanied by machining pressure, e.g. discharge pressure and/or expansion pressure of gases produced, and accordingly tends to force the advancing wire electrode back or in the direction opposite the direction of advance in the ordinary or rough-cutting operation. In the finish-cutting step, the wire electrode must be advancing semi-tangentially along the rough-cut contour and there develops an imbalance in the machining pressure on one and the other semi-circular surface sides on the wire electrode with respect to the direction of advance, which produces additionally a wire deflection force which tends to force the wire electrode in a direction away from the workpiece contour being finish-cut and may give rise to finishing inaccuracy. It has been found that this additional wire deflection force develops in spite of a considerable external tension applied to the linear wire stretch bridged and traveling across the cutting zone and increases with the increase in the thickness of the workpiece. Thus, when the trajectory of displacement of the wire electrode in the finishing step is a path simply shifted from that in the roughing step by a distance defined roughly on the conventional empirical basis or without regard to the workpiece thickness, the desired finished precision could not be obtained. The position of the wire electrode may even be shifted far away from the given wire trajectory in the finishing step so that the machined contour in the workpiece deviates largely from the desired contour.

OBJECTS OF THE INVENTION

It is accordingly an important object of the present invention to provide an electroerosion wire-cutting method whereby a contour as precisely as desired and with a due surface finish is formed in a workpiece.

Another object of the invention is to provide a method of electroerosively wire-cutting a workpiece to form a desired contour therein with increased precision and efficiency over the prior art.

A further specific object of the invention is to provide an improved two- or multiple-step electroerosive wire-cutting method wherein the dependency of the cutting accuracy in the finishing step on the thickness of a workpiece is effectively overcome.

SUMMARY OF THE INVENTION

These and other objects are attained in accordance with the present invention by a method of cutting a workpiece to form a desired contour therein with a continuous wire electrode axially advanced to linearly traverse the workpiece across a cutting zone and also displaced relative to the workpiece transversely to the axis of the wire electrode, which method comprises the steps of: (a) electroerosively rough-cutting the workpiece while effecting a transverse relative displacement between the wire electrode and the workpiece along a first predetermined path corresponding to the desired contour and defined to generate a rough-cut contour with an overcut $\alpha$ in the workpiece; and (b) electroerosively finish-cutting the workpiece while effecting the transverse relative displacement between the wire electrode and the workpiece along a second predetermined path shifted by a distance defined substantially by an expression; $n \times \alpha$ (the product n times $\alpha$) uniformly from the first predetermined path where n is a value essentially proportional to the thickness of the workpiece, thereby generating a finish-cut contour coinciding with the desired contour in the workpiece.

BRIEF DESCRIPTION OF THE DRAWING

These and other objects, features and advantages of the present invention will become more readily apparent from the following description of certain embodiments of the principles thereof, reference being made to the accompanying drawing in which.

SPECIFIC DESCRIPTION

Figure 1:
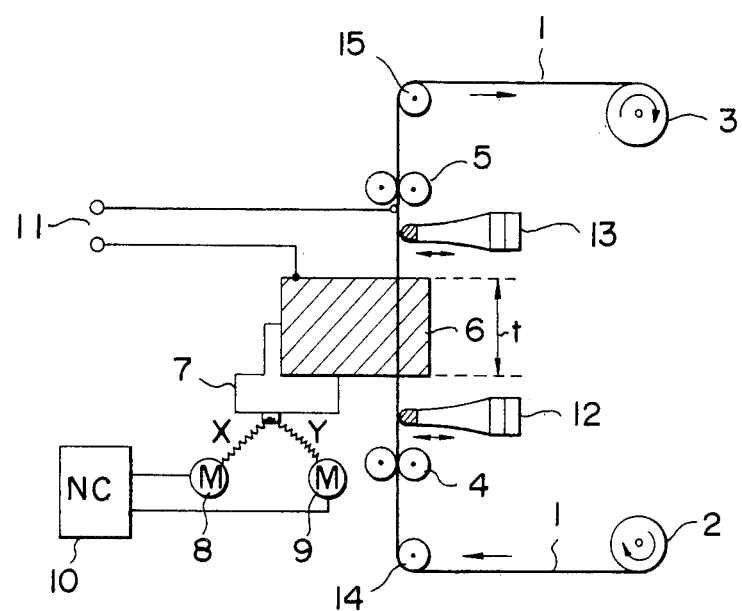
FIG. 1 is a schematic view essentially in section diagrammatically illustrating an apparatus for carrying out the method of the invention.

Referring to FIG. 1, an electrical-discharge wire-cutting arrangement includes a wire electrode 1 axially advanced from a supply reel 2 to a takeup reel 3 continuously through a cutting zone defined between a pair of guide means 4 and 5. A workpiece 6 is disposed in the cutting zone and traversed by a linear stretch of the wire electrode 1 tightly bridged and continuously traveling across the guide means 4 and 5. Further wire guide members 14 and 15 are provided in the wire travel path to change the direction of advance of the wire electrode 1 from the supply side 2 to the cutting zone and from the latter to the takeup side 3, respectively.

In the cutting zone, a machining liquid is supplied from nozzle means (not shown) to flood the machining gap formed between the wire electrode 1 and the workpiece 6. An EDM (electrical discharge machining) power supply 11 has a pair of output terminals electrically connected to the wire electrode 1 and to the workpiece 6, respectively, to apply a succession of electrical machining pulses across the machining gap filled with the machining liquid to electroerosively remove material from the workpiece 6.

The workpiece 6 is securely mounted on a worktable 7 and the drive system for displacing the workpiece 6 relative to the wire electrode 1 transversely to the axis thereof or in an X-Y plan includes a first motor 8 for feeding the worktable 7 along the X-axis and a second motor 9 for feeding the worktable 7 along the Y-axis, the motors 8 and 9 being driven by electrical signals furnished by a numerical controller 10.

In addition or optionally, a pair of vibrator unit 12 and 13 are provided in contact with or in close proximity to the wire electrode 1 between the machining guide means 4 and 5 and at opposite sides of the workpiece 6, respectively. The vibrators 12 and 13 are energized by high-frequency power supply means (not shown) of a frequency or frequencies not lower than 100 Hz and, preferably between 1 and 50 kHz to impart to the stretch of the traveling wire 1 between the guide means 4 and 5, vibrations of an amplitude between 1 and 50 microns and, preferably between 1 and 10 microns. By virtue of the vibrator arrangement, any arc discharge or short-circuiting condition can, immediately upon development, be extinguished mechanically and the contact friction over the guide means 4 and 5 can markedly be reduced. Further, the removal of machining products and gases produced in the machining gap which tend to disturb the machining stability is facilitated with the result that steady machining is continued with a stability without breakage of the wire electrode 1 and with an increased removal rate.

The vibrations are imparted at one or both of the locations shown to the wire electrode 1 in a direction transverse to the axis thereof so that an undulating oscillatory motion with more than two nodes and antinodes or loops is provided in the wire 1 traveling between the two guide members 4 and 5 positioned at opposite sides with respect to the workpiece 6.

The vibrations are preferably imparted at the two locations shown, which are opposite with respect to the workpiece 6, to the wire electrode 1 each in a direction transverse to the axis thereof so that they are superimposed upon one another to create a composite undulating oscillatory motion with more than two nodes and antinodes or loops in the wire 1 traveling between the two guide members 4 and 5 positioned at opposte sides with respect to the workpiece and each outside of each location at which the vibration is applied.

By imparting a vibration to the traveling wire electrode 1 at one or preferably both sides of the workpiece 6 through which it is passed in a traveling-wire electroerosion system, it has been found that an improvement in the removal rate is attained, this being especially noticeable when workpieces of a greater thickness are machined. Thus, an intensified pumping action appears to be generated in the cutting zone to facilitate removal of machined products therefrom, i.e. chips and gases and, of even more importance, a highly effective dispersive production of successive discharges in the cutting zone over the entire workpiece thickness is assured, thus favorably restraining the discharges from being concentrated on a single point or region of the wire electrode 1 traversing or traveling through the workpiece 6.

The vibrations imparted at the two opposite locations with respect to the workpiece 6 are preferably of different frequencies such that a beat or the periodic variation in amplitude of a wave that is the superimposition of the corresponding two simple harmonic waves of the different frequencies is produced in the traveling wire electrode 1. This arrangement is advantageous to facilitate and enhance the removal of machining chips and other gap products while suppressing the temperature rise of the workpiece 6 being cut.

The two vibration means 12 and 13 are preferably in some cases positioned at their respective locations so as to provide the respective vibrations in directions transverse to each other, viz., for example, one in the direction of X-axis and the other in the direction of Y-axis, the axes along which the workpiece 6 is displaced relative to the traveling wire electrode 1 by the aforementioned drive means e.g. a numerically controlled drive means.

Each of the vibrator means 12, 13 is preferably in contact with a guide member 4, 5 for the electrode 1 and may be an electromagnetic, or a sonic or ultrasonic vibrator. Each vibrator means may be a magnetostrictive or piezoelectric vibrator. The vibrators 12 and 13 may be connected for energization with respective resonant circuits (not shown) each connected across the machining gap.

A control system (not shown) is preferably provided, in operation of the apparatus, to respond to the machining gap condition to cause a parameter of the vibrations to be modified in response to the gap state. The vibrator means 12 and 13 are preferably arranged to be cooled by a coolant fluid.

In the use of the apparatus, the machining liquid is advantageously supplied to the wire electrode 1 by flowing through the location where the vibrator end of each vibrator arrangement comes in contact with the wire 1 or by flowing in contact with the body of each vibrator so that the heat generated at the vibrating body is sufficiently dissipated to avoid a detrimental heating of the wire electrode 1.

It is generally desirable to keep the plane of the wire vibration in coincidence with the direction of advance in the relative transverse displacement of the workpiece 6 to the axially traveling wire electrode 1.

The wire-vibration arrangement described can, as described below, be advantageously employed in a double- or multi-step electrical machining operation including a finish-cutting, reforming or secondary-cutting step to which a workpiece 6 rough-cut in the preliminary cutting step is subjected to finish the machined surface contour with due precision and surface finish. The problem inherent to this operation is the fact that it is extremely difficult to maintain a desired cutting depth precisely constant. In the finish-cutting operation, a force tending to force the wire electrode 1 away from the previously rough-cut contour in the workpiece 6 being finish-cut develops at all times due to a pressure caused by the machining discharges and the decomposed gases expanding in the machining liquid in the gap region. This force causes the wire 1 to be bent and to come off from the directed position so that the cutting depth may variably be deviated.

Figure 2:
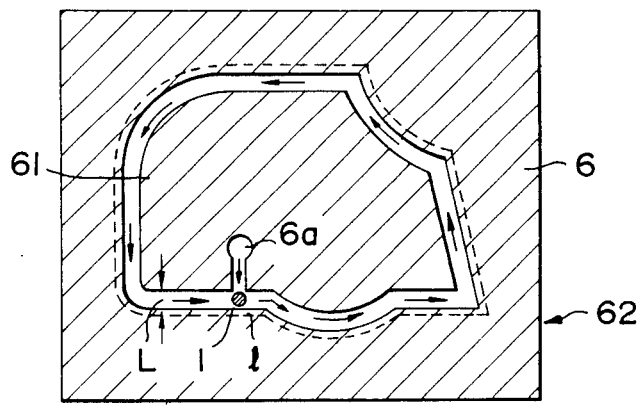
FIG. 2 is a plan view diagrammatically illustrating a workpiece preliminarily machined in a rough-cutting step and to be secondarily machined in a finish-cutting step in accordance with the invention.

Referring now to FIGS. 1 and 2, a traveling-wire EDM operation comprising roughing and finishing steps in accordance with the present invention is described. A workpiece 6 having a starting bore 6a formed therethrough at a predetermined location by mechanical or EDM drilling is first set on the worktable 7. The wire electrode 1 is threaded through the bore 6a and the wire drive mechanism (not shown) is actuated to axially advance the wire electrode 1 in the direction of arrow and to transport it from the supply reel 2 onto the takeup reel 3 via guides 14 and 4, the bore 6a and guides 5 and 15 under a predetermined tension. A machining-liquid circulation unit (not shown) is operated to supply the machining liquid through the nozzles into the region of the workpiece 6 so that the machining gap is flooded uniformly therewith. The EDM power supply 11 is turned on to apply a succession of electrical pulses across the gap between the traveling wire electrode 1 and the workpiece 6, thereby effecting successive machining discharges between them through the liquid medium to remove material from the workpiece 6. In the course of cutting operation, the vibrators 12 and 13 may be operated to function in the manner already described.

Figure 3:
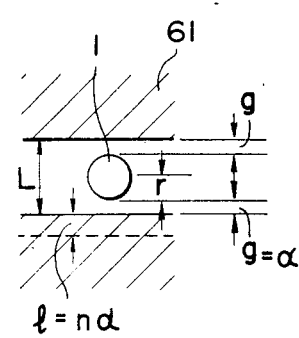
FIG. 3 is an enlarged diagrammatic view of a portion of the arrangement of FIG. 2.

A predetermined cutting path corresponding to a desired contour is programmed in advance in the numerical controller 10 whose output signals are applied to the drive motors 8 and 9 to displace the worktable 7 so that the workpiece 6 carried thereby moves along the programmed path relative to the traveling wire electrode 1. In the course of the rough-cutting feed displacement, as seen from FIG. 2, the wire electrode 1 moves relative to the workpiece 6, first advancing from the position of the preformed starting bore 6a in the workpiece 6 rectilinearlly along the shortest distance to a point on the programmed rough-cutting contour, then following the latter path as indicated by the arrows back to that point. The cutting width L formed during this rough-contouring operation is, as better seen from FIG. 3, defined by $2(r+g)$ where r is the radius of the wire electrode and g is the machining gap spacing which may be equivalent to overcut $\alpha$. When the wire 1 returns to the initial point, the core portion 61 of the machined or rough-cut workpiece 6 surrounded by the inner edge of the path is separated from the remainder thereof 62 surrounding the outer edge of the path and constituting the rough-contoured workpiece.

After the above roughing step is accomplished, the workpiece 62 is to be formed with a further cut of a width or depth 1, indicated by the broken line, by the succeeding finish-cutting step. The width 1 is generally smaller than the previous cut width L and the finishing step is generally performed at a faster cutting rate and desirably with a minimum amount of material removal to finish the previously machined contour and surface. In accordance with the present invention, the cutting path in the finishing step is shifted by a distance $n\alpha$ from the cutting path in the roughing step where $\alpha$ is the overcut in the roughing step and n is a value, preferably, an integer, essentially proportional to the thickness t of the workpiece 6 (FIG. 1) so that the depth 1 is removed in the finishing step. In other words, it is essential in accordance with the principles of the present invention that the trajectory of the wire electrode 1 displaced transversely relative to the workpiece 6 in the finishing step be shifted by the distance $n\alpha$ from the trajectory of the wire electrode displaced in the roughing step. The values $\alpha$ and n are defined in conjunction with of the radius of the wire electrode r to achieve the widths (L/2) and 1, hence (L/2)+1 in defining the first programmed cutting path to be traveled by the center axis of the wire electrode 1 in the roughing step. Then the contouring feed applied during the finishing step by the numerical controller 10 is, as indicated by the broken line, an enlarged feed defined by the addition of the width 1, which is equal to $n\alpha$, to the previous rough-cutting path.

The overcut $\alpha$ which results from the roughing step is a well-accepted term in electrical machining and is here defined by the minimum distance between the rough-cut contour at any point thereon and the path of displacement of the center axis of the wire electrode less the radius of the wire electrode. As will readily be seen, it is basically dependent on the size of the machining gap g but further on the other gap parameters such as the nature of machining products in the gap during wire-cutting and, when vibrations as described before are imparted to the wire electrode, still further on the amplitude of the vibrations. At any event, the overcut $\alpha$ can be determined in setting and preparatory to, the roughing step.

EXAMPLE

In determining the trajectory of a wire electrode 1 (e.g. a copper wire of a diameter of 0.2 mm) and hence the programmable path of a workpiece (e.g. carbon steel) previously rough-cut with an overcut $\alpha$ and displaced relative to the center axis of the wire electrode 1 in the finishing step, the values n and $l = n\alpha$ are set, for example, as follows:

| Workpiece thickness | n | l |
|---|---|---|
| 20$^{mm}$ | 1 | $\alpha$ |
| 40$^{mm}$ | 2 | $2\alpha$ |
| 80$^{mm}$ | 4 | $4\alpha$ |

It has been found that for the varying values of the workpiece thickness, the thickness of the finish-cut layer is uniformly constant, hence the finish-cutting precision extremely high. The ratio of removal rate in roughing and finishing is then 1:4. The value $\alpha$ is determined by parameters of machining pulses, and wire and workpiece materials and, to this extent only, the value l may depend on these parameters and materials.

The trajectory of the wire electrode 1 in the finishing step may be shifted by $l = n\alpha$ from the trajectory of the wire electrode in the roughing step by using the vibrator means 12 and 13 hereinbefore described. In this case, no change in the programmed cutting path from the roughing step to the finishing step may be required when the amplitude of the vibrations which then defines the shift $l = n\alpha$ does not exceed preferably 1 to 5 micron and at most 10 microns.

The vibrators 12 and 13 are preferably coupled together and oriented so that the direction of the plane of the composite vibrations which result is maintained to be essentially perpendicular to the direction of advance of the wire electrode 1 in the finishing step.

There is thus provided an improved electroerosion method of wire-cutting a desired contour in a workpiece, which overcomes the problems encountered in the prior art.

What is claimed is:

1. A method of cutting a workpiece to form a desired final contour therein with a continuous wire electrode which has a predetermined thickness and is adapted to be axially advanced to linearly traverse the workpiece across a cutting zone and also displaced relative to the workpiece transversely to the axis of the wire electrode, said method comprising the steps of:
    (a) electroerosively rough-cutting said workpiece while effecting the transverse relative displacement between said wire electrode and said workpiece along a first predetermined path corresponding to said desired final contour and prescribed to generate a desired rough-cut contour with an overcut $\alpha$ in said workpiece; and
    (b) electroerosively finish-cutting said rough-cut workpiece while effecting the transverse displacement between said wire electrode and said workpiece along a second predetermined path substantially uniformly by a distance defined by the product $n\alpha$ where n is a value essentially proportional to the thickness of the workpiece traversed by the wire electrode, thereby generating a finish-cut contour coinciding with said desired contour in said workpiece,
    said first predetermined path being preprogrammed in a numerical controller associated with a drive system for effecting said transverse displacement between said wire electrode and said workpiece for executing the step (a) on the basis of said desired contour and said desired overcut $\alpha$,
    said second predetermined path being preprogrammed in said numerical controller on the basis of said first predetermined path and adding thereto information representing the expression $n\alpha$ for executing the step (b).

2. A method of cutting a workpiece to form a desired final contour therein with a continuous wire electrode which has a predetermined thickness and is adapted to be axially advanced to linearly traverse the workpiece across a cutting zone and also displaced relative to the workpiece transversely to the axis of the wire electrode, said method comprising the steps of:
    (a) electroerosively rough-cutting said workpiece while effecting the transverse relative displacement between said wire electrode and said workpiece along a first predetermined path corresponding to said desired final contour and prescribed to generate a desired rough-cut contour with an overcut $\alpha$ in said workpiece;
    (b) electroerosively finish-cutting said rough-cut workpiece while effecting the transverse displacement between said wire electrode and said workpiece along a second predetermined path shifted from said first predetermined path substantially uniformly by a distance defined by the product $n\alpha$ where n is a value essentially proportional to the thickness of the workpiece traversed by the wire electrode, thereby generating a finish-cut contour coinciding with said desired contour in said workpiece; and
    (c) imparting vibrations to said wire electrode transversely to the axis thereof in said cutting zone in step (b), the vibrations being of an amplitude essentially equal to $n\alpha$, thereby in effect shifting said first predetermined path of the step (c) by the distance essentially $n\alpha$ to produce in effect said predetermined path in the step (b).

3. The method defined in claim 2 wherein said amplitude of vibrations is at most 10 microns.

4. The method defined in claim 1 or claim 2 wherein n is an integer.

5. A method of electroerosively cutting a workpiece to form a desired final contour therein with an axially continuously renewed electrode wire having a predetermined thickness wherein the electrode wire is axially advanced continuously from supply means onto takeup means through the workpiece in a cutting zone while the workpiece is displaced relative to the advancing electrode wire transversely to the axis thereof, which method comprises the steps of:

(a) electroerosively rough-cutting the workpiece while effecting the transverse relative displacement so that the trajectory of the electrode wire closer to said desired final contour follows a first predetermined path spaced by an overcut $\alpha$ substantially uniformly from a rough-cut contour desired in the workpiece;

(b) prior to step (a), determining said overcut $\alpha$ from machining conditions to be employed in step (a) and determining said rough-cut contour so as to be spaced substantially uniformly from said desired final contour by a distance defined by an expression $(n+1)\alpha$ where n is an integer; and (c) subsequent to step (a), electroerosively finish-cutting said rough-cut workpiece while effecting the transverse relative displacement so that the trajectory of the electrode wire closer to said desired final contour follows a second predetermined path corresponding thereto and substantially uniformly spaced by a distance $n\alpha$ from said first predetermined path, wherein in steps (a) and (c), the axis of the electrode wire is displaced relative to the workpiece along respective paths which are substantially coincident with one another and in step (c), a vibration is imparted to said electrode wire transversely to the axis thereof at least in said cutting zone, said vibration being of an amplitude substantially equal to said distance $n\alpha$, thereby permitting said trajacetory of the electrode wire to follow said second predetermined path in step (b).

6. The method defined in claim 5 wherein said amplitude of vibration ranges between 1 and 50 microns.

7. A method of electroerosively cutting a workpiece to form a desired final contour therein with an axially continuously renewed electrode wire having a predetermined thickness wherein the electrode wire is axially advanced continuously from supply means onto takeup means through the workpiece in a cutting zone while the workpiece is displaced relative to the advancing electrode wire transversely to the axis thereof, which method comprises the steps of:

(a) electroerosively rough-cutting the workpiece while effecting the transverse relative displacement so that the trajectory of the electrode wire closer to said desired final contour follows a first predetermined path spaced by an overcut $\alpha$ substantially uniformly from a rough-cut contour desired in the workpiece;

(b) prior to step (a), determining said overcut $\alpha$ from machining conditions to be employed in step (a) and determining said rough-cut contour so as to be spaced substantially uniformly from said desired final contour by a distance defined by an expression $(n+1)\alpha$ where n is an integer; and (c) subsequent to step (a), electroerosively finish-cutting said rough-cut workpiece while effecting the transverse relative displacement so that the trajectory of the electrode wire closer to said desired final contour follows a second predetermined path corresponding thereto and substantially uniformly spaced by a distance $n\alpha$ from said first predetermined path;

wherein in steps (a) and (c), the axis of the electrode wire is displaced relative to the workpiece along respective paths which are substantially coincident with one another and in steps (a) and (c), vibrations are imparted to said electrode wire transversely to the axis thereof at least in said cutting zone, the vibration in step (c) being greater in amplitude than the vibration in step (a) by a difference which is substantially equal to said distance $n\alpha$, thereby permitting said trajectory of the electrode wire to follow said second predetermined path in step (c) which is spaced substantially uniformly by said distance $n\alpha$ from said first predetermined path in step (a).

8. A method of electroerosively cutting a workpiece to form a desired final contour therein with an axially continuously renewed electrode wire hving a predetermined thickness wherein the electrode wire is axially advanced continuously from supply means onto takeup means through the workpiece in a cutting zone while the workpiece is displaced relative to the advancing electrode wire transversely to the axis thereof, which method comprises the step of:

(a) electroerosively rough-cutting the workpiece while effecting the transverse relative displacement so that the trajectory of the electrode wire closer to said desired final contour follows a first predetermined path spaced by an overcut $\alpha$ substantially uniformly from a rough-cut contour desired in the workpiece;

(b) prior to step (a), determining said overcut $\alpha$ from machining conditions to be employed in step (a) and determining said rough-cut contour so as to be spaced substantially uniformly from said desired final contour by a distance defined by an expression $(n+1)\,\alpha$ where n is an integer; and (c) subsequent to step (a), electroerosively finish-cutting said rough-cut workpiece while effecting the transverse relative displacement so that the trajectory of the electrode wire closer to said desired final contour follows a second predetermined path corresponding thereto and substantially uniformly spaced by a distance $n\alpha$ from said first predetermined path, in step (b), said first predetermined path being preprogrammed in a numerical controller associated with a drive system for effecting said transverse displacement between said electrode wire and said workpiece for executing the step (a) on the basis of said desired contour, said desired overcut $\alpha$ and information representing the expression $(n+1)\alpha$, and said second predetermined path is preprogrammed in said numerical controller on the basis of said first predetermined path and adding thereto information representing the expression $n\alpha$ for executing the step (c).

* * * * *

UNITED STATES PATENT AND TRADEMARK OFFICE
CERTIFICATE OF CORRECTION

PATENT NO. : 4,673,787

DATED : June 16, 1987

INVENTOR(S) : Kiyoshi INOUE

It is certified that error appears in the above-identified patent and that said Letters Patent is hereby corrected as shown below:

column 8, line 4, after "path" read -- shifted from said first predetermined path --.

Signed and Sealed this

Twenty-second Day of December, 1987

Attest:

DONALD J. QUIGG

*Attesting Officer*  *Commissioner of Patents and Trademarks*